United States Patent
Kundu

(10) Patent No.: US 10,984,557 B2
(45) Date of Patent: Apr. 20, 2021

(54) CAMERA CALIBRATION USING TRAFFIC SIGN RECOGNITION

(71) Applicant: Hitachi Automotive Systems, Ltd., Ibaraki (JP)

(72) Inventor: Subrata Kumar Kundu, Farmington Hills, MI (US)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/643,715

(22) PCT Filed: Sep. 26, 2017

(86) PCT No.: PCT/US2017/053380
§ 371 (c)(1),
(2) Date: Mar. 2, 2020

(87) PCT Pub. No.: WO2019/066770
PCT Pub. Date: Apr. 4, 2019

(65) Prior Publication Data
US 2020/0211226 A1    Jul. 2, 2020

(51) Int. Cl.
*G06T 7/80* (2017.01)
*G05D 1/02* (2020.01)
*G06K 9/00* (2006.01)

(52) U.S. Cl.
CPC .............. *G06T 7/85* (2017.01); *G05D 1/0251* (2013.01); *G06K 9/00798* (2013.01);
(Continued)

(58) Field of Classification Search
CPC ... G06T 7/85; G06T 2207/30252; G06T 7/80; G06K 9/00798; G06K 9/00818; G06K 2209/15; G05D 1/0251; G05D 2201/0213
(Continued)

(56) References Cited

U.S. PATENT DOCUMENTS

2007/0154068 A1    7/2007  Stein et al.
2008/0137908 A1    6/2008  Stein et al.
(Continued)

OTHER PUBLICATIONS

International Search Report of PCT/US2017/053380 dated Dec. 5, 2017.

*Primary Examiner* — Robert Chevalier
(74) *Attorney, Agent, or Firm* — Mattingly & Malur, PC

(57) ABSTRACT

In some examples, processor(s) of a vehicle may store specified dimensions of a plurality of first objects. The processor(s) may receive a first image from a camera onboard the vehicle, recognize a first object within the image, and determine, based on the first image, a distance to the first object from the camera, and a width and height of the first object. Further, the processor(s) may determine a first measurement error from the determined width of the first object and a specified width of the first object, and a second measurement error from the determined height of the first object and the specified height of the first object. Based on the first and second measurement error, the processor(s) may determine a third measurement error, may determine one or more calibration parameters of the camera based on the determined measurement errors, and may use the calibration parameters for subsequently received images.

20 Claims, 10 Drawing Sheets

(52) U.S. Cl.
CPC . *G06K 9/00818* (2013.01); *G05D 2201/0213* (2013.01); *G06K 2209/15* (2013.01)

(58) Field of Classification Search
USPC ..... 348/47, 50, 73, 113, 116, 118, 121, 135, 348/143, 148
See application file for complete search history.

(56) References Cited

U.S. PATENT DOCUMENTS

| | | |
|---|---|---|
| 2010/0321490 A1 | 12/2010 | Chen et al. |
| 2012/0224069 A1 | 9/2012 | Aoki |
| 2013/0135474 A1 | 5/2013 | Sakano et al. |
| 2013/0169822 A1 | 7/2013 | Zhu et al. |
| 2014/0347872 A1* | 11/2014 | Foltin ................ G06K 9/00825 362/466 |
| 2015/0215588 A1 | 7/2015 | Schofield et al. |
| 2016/0125608 A1* | 5/2016 | Sorstedt ............... G06K 9/6201 348/148 |
| 2017/0032526 A1 | 2/2017 | Gao et al. |

\* cited by examiner

| | | | | | FIRST JURISDICTION | | | |
|---|---|---|---|---|---|---|---|---|
| SIGN TYPE | WIDTH | HEIGHT | NUMBER HEIGHT | LETTER HEIGHT | DIMENSION FROM CENTER LINE OF A FIRST WORD | DIMENSION FROM CENTER LINE OF A SECOND WORD | BORDER DIMENSION | OUTSIDE EDGE OF BORDER TO EDGE OF SIGN |
| SPEED LIMIT (CONVENTIONAL ROAD) | 24 | 30 | 10 | 4 | 9.563 | 7.313 | .625 | .375 |
| ⋮ | ⋮ | ⋮ | ⋮ | ⋮ | ⋮ | ⋮ | ⋮ | ⋮ |
| | | | | | SECOND JURISDICTION | | | |
| SIGN TYPE | WIDTH | HEIGHT | NUMBER HEIGHT | LETTER HEIGHT | DIMENSION FROM CENTER LINE OF A FIRST WORD | DIMENSION FROM CENTER LINE OF A SECOND WORD | BORDER DIMENSION | OUTSIDE EDGE OF BORDER TO EDGE OF SIGN |
| SPEED LIMIT (CONVENTIONAL ROAD) | 34 | 40 | 30 | 14 | 19.563 | 17.313 | 1.625 | 1.375 |
| ⋮ | ⋮ | ⋮ | ⋮ | ⋮ | ⋮ | ⋮ | ⋮ | ⋮ |

FIG. 5

| FIRST JURISDICTION | |
|---|---|
| ROAD MARK TYPE | DIMENSIONS (w,d) |
| BICYCLE | 40, 72 |
| ⋮ | ⋮ |
| SECOND JURISDICTION | |
| ROAD MARK TYPE | DIMENSIONS (w,d) |
| BICYCLE | 50, 82 |
| ⋮ | ⋮ |

| DISTANCE | Δx | Δy | Δz | UPDATED z |
|---|---|---|---|---|
| $z_1$ | $\Delta x_1$ | $\Delta y_1$ | $\Delta z_1 = F(\Delta x_1, \Delta y_1)$ | $z_1 + \Delta z_1$ |
| $z_2$ | $\Delta x_2$ | $\Delta y_2$ | $\Delta z_2 = F(\Delta x_2, \Delta y_2)$ | $z_2 + \Delta z_2$ |
| $z_3$ | $\Delta x_3$ | $\Delta y_3$ | $\Delta z_3 = F(\Delta x_3, \Delta y_3)$ | $z_3 + \Delta z_3$ |
| $z_m$ | $\Delta x_m$ | $\Delta y_m$ | $\Delta z_m = F(\Delta x_m, \Delta y_m)$ | $z_m + \Delta z_m$ |

FIG. 9

CAMERA CALIBRATION USING TRAFFIC SIGN RECOGNITION

TECHNICAL FIELD

This disclosure relates to the technical field of automatic calibration of one or more cameras used onboard a vehicle.

BACKGROUND

Advanced driver assistance systems (ADASs) and self-driving or otherwise autonomous and semi-autonomous vehicle systems automate or otherwise enhance vehicle systems for improved safety, automated driving, and the like. These systems realize improved safety, comfort, fuel economy, and the like. A number of different sensors such as cameras, radar, LIDAR, GPS (Global Positioning System), ultrasonic sensors, etc. are widely used in ADAS and autonomous systems to capture and integrate different sources of information. The environmental information around the vehicle captured by these sensors may be used as input information to a controller to intelligently control a vehicle, for example, by eliminating the chance of collision, reducing the fuel consumption, and increasing the convenience and safety to passengers.

Among various sensors for ADAS systems, vision based sensors, i.e., one or more cameras of vision sensor systems can be generally classified into two categories, monocular and stereo vision. Stereo vision systems allow for distinguishing different points on a certain straight line using displacement between left and right images. Whereas, in monocular visions systems using a mono camera, corresponding points are mapped into one point. Thus, stereo cameras are widely used in ADAS applications, which provides better 3D (three-dimensional) measurement accuracy of an object compared to monocular vision systems and other sensors.

SUMMARY

Some implementations include arrangements and techniques for automatically calibrating parameters of a camera of a vision sensor system onboard a vehicle. For example, one or more processors may receive at least one first image from the camera onboard the vehicle and recognize a first object within the received at least one first image. The one or more processors may determine, based on the at least one first image, a distance of the first object from the camera in a first direction, a width of the first object in a second direction, and a height of the first object in a third direction. Further, the one or more processors may receive, from stored first object information, specified dimensions of the recognized first object including a specified width of the recognized first object and a specified height of the recognized first object, and may further determine a measurement error of the second direction based on the determined width of the first object and the specified width of the first object, and determine a measurement error of the third direction based on the determined height of the first object and the specified height of the first object. The one or more processors may determine a measurement error of the first direction based on the determined measurement error of the second direction and the determined measurement error of the third direction and determine one or more calibration parameters of the camera based on the determined measurement errors of the first, second, and third directions. Subsequently, the one or more processors may determine at least one of a distance along a first direction, a width along a second direction, or a height along a third direction of a second object for at least one second image received from the camera using the one or more calibration parameters.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates an example sign information data structure for storing sign information according to some implementations.

FIG. 6 illustrates an example road marking information data structure for storing road marking information according to some implementations.

FIG. 9 illustrates an example of a data structure that stores information for the calculated errors of each of the X, Y, and Z directions for each measured distance from a camera to a traffic sign according to some implementations.

DESCRIPTION OF THE EMBODIMENTS

Figure 1:
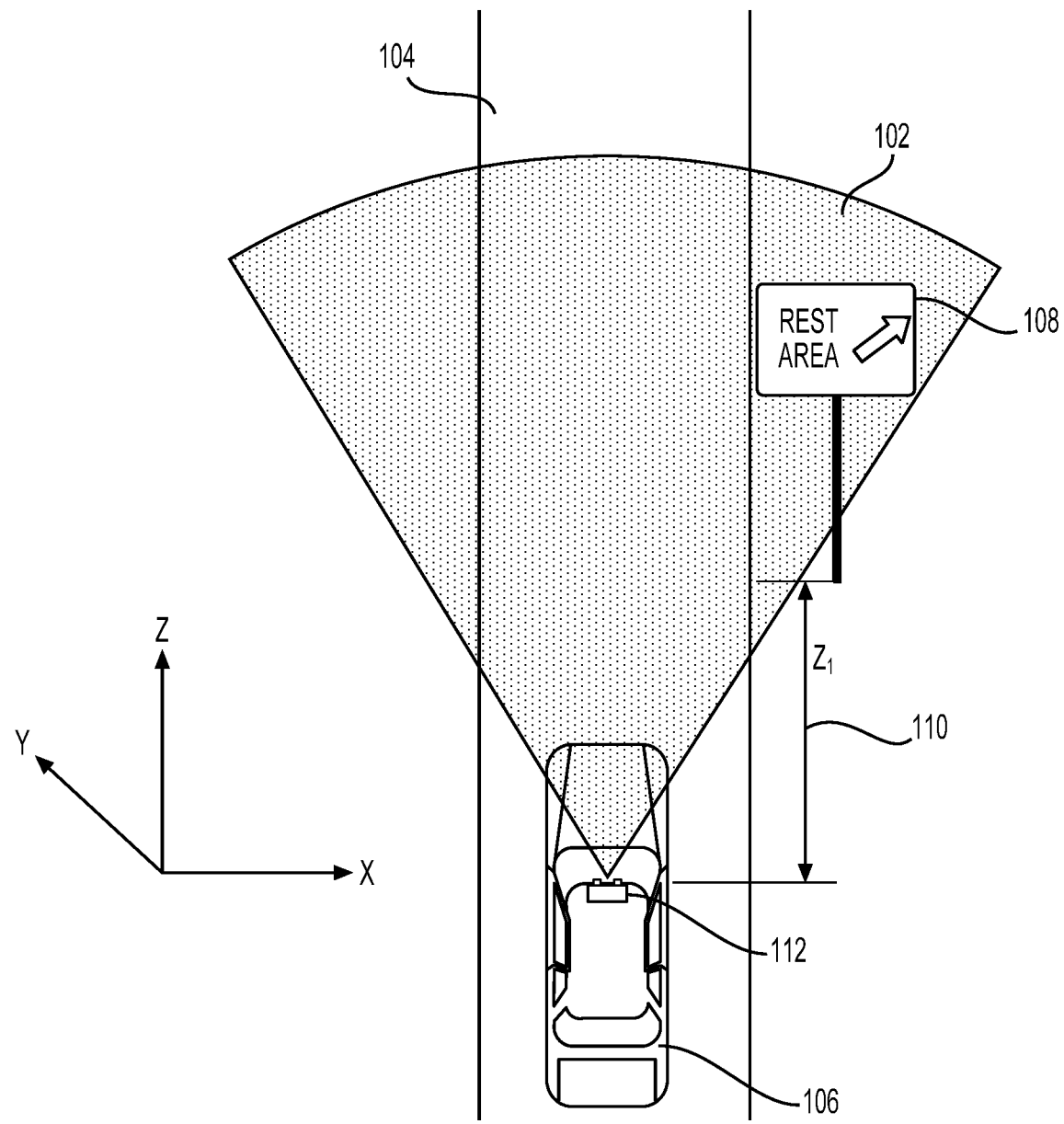
FIG. 1 illustrates an example of detecting a traffic sign according to some implementations.

Some examples herein continuously and automatically calibrate parameters of a camera of a vision sensor system onboard a vehicle to realize precise 3D measurement of object size (e.g., height and width) and a distance of the object from the camera. Automatic calibration herein may include determining measurements for a detected and recognized traffic sign, which may include a distance to the traffic sign from the vehicle, a height of the traffic sign, and a width of the traffic sign. The calibration process may compare the determined measurements to one or more actual measurements of the traffic sign and then calculate calibration parameters to be used for calibrating the camera.

An ADAS uses sensor systems to detect objects using sensors, such as a camera, radar, LIDAR, GPS, ultrasound, etc., and the ADAS information may be used as input to a vehicle controller to control the vehicle. One application of the ADAS herein includes a traffic sign recognition (TSR) function, which may use recognition logic to detect and recognize one or more traffic signs from one or more images acquired by the one or more cameras of a vision sensor system on board a vehicle. The calibration parameters of the one or more cameras may be automatically calibrated using, in part, the information of the recognition logic, actual dimension of the traffic sign, and information indicating a relationship between errors in respective X, Y, and Z directions based on temperature. For example, recognized traffic sign information may be used to intelligently control the vehicle speed, stop the vehicle, set the speed limit for an adaptive cruise control system, etc.

The effectiveness of any ADAS application may largely depend on the 3D measurement accuracy of one or more stereo cameras within the vision sensor system. For example, precise 3D measurement of object size and distance is a crucial function of stereo camera. Further, automatic and accurate calibration of the calibration parameters of the one or more cameras of the vision sensor systems enables accurate and precise control of the vehicle, for example, which may depend on accurate 3D measurement of an object's size and distance for collision avoidance, for example. Camera calibration enables realization of 3D measurement from 2D images. In the examples herein, camera calibration may indicate geometric camera calibration, which may also be known as camera resectioning.

Calibration parameters of a camera may include intrinsic, extrinsic, and distortion parameters. Distortion parameters may be used to realize an undistorted image. Extrinsic parameters, which may include a rotation matrix and a translation vector, may be used to transform world coordinates into camera coordinates. Intrinsic parameters, which may include the focal length, the optical center, and the skew coefficient, for example, may be used to transform the camera coordinates into an image plane.

In some examples herein, the camera may be calibrated before actual use in a vehicle. The calibration parameters may be set in the camera during factory calibration so that the system (e.g., processing unit of the camera) can measure the 3D measurement using the defined calibration parameters. However, one or more of the intrinsic parameters, e.g., focal length of the camera, may change according to temperature. Therefore, even for a factory calibrated camera, an error in 3D measurement could occur since the focal length may vary according to temperature. An inaccurate or non-calibrated focal length may result in an inaccurate 3D measurement of objects. Accordingly, it is desirable to automatically and continuously calibrate the focal length of a camera for accurate 3D measurement.

As one example, as a vehicle travels on a road, a vision sensor system may execute recognition logic, such as a recognition program, for recognizing a type of traffic sign in a field of view of a camera or other sensor mounted on the vehicle. The vision sensor system may access a storage that stores traffic sign information in a database or other data structure. Once recognized, one or more processors of the vision sensor system may compare one or more of the actual traffic sign dimensions of the recognized traffic sign with one or more measured sign dimensions of the recognized traffic sign to calculate X direction, Y direction, and Z direction errors. For example, a Z direction error may be calculated using a relationship between a Z direction error and a calculated X direction error and a calculated Y direction error, based on a temperature. For example, based on the relationship, if the X direction error, the Y direction error, and the temperature are known, then the Z direction error can be determined. From a determined Z direction error, a focal length calibration parameter may be calculated. Therefore, calibration parameters based on calculated X direction, Y direction, and Z direction errors may be calculated and used in subsequent 3D measurement of objects.

In some examples, one or more cameras mounted on the vehicle may receive images of traffic signs in their respective fields of view as the vehicle travels on the road. The recognition logic may first detect one or more signs in a received image during a detection stage. Subsequently, during a recognition stage, the detected traffic sign may be identified as a particular type of traffic sign. As one example, the recognition stage may include tracking of the detected sign through a series of subsequent images of the sign to obtain sufficient visual information about the sign to perform recognition of the sign type of the sign. For instance, tracking of the detected sign through a plurality of subsequently captured images may improve accuracy of the recognition by providing a plurality of different images of the same sign for recognition. Further, the tracking of the sign through a sequence of multiple images may enable a more accurate determination of the location of the sign relative to the vehicle, which results in a more accurate calibration of the camera system and more accurate measurement and detection of objects detected by the camera system.

There are many different types of traffic signs, which may be used at various different roadside locations for various purposes. Traffic signs may be broadly classified into a plurality of groups, such as regulatory signs, warning signs, guide signs, services signs, construction signs, recreation signs, pedestrian/bicycle signs, and incident management signs. The recognition logic herein is able to recognize signs within one or more captured images according to sign type. Furthermore, the size dimensions (e.g., width and height) of each type of traffic sign with respect to a particular type of road may be generally specified for each geographic jurisdiction in which the vehicle might travel. Additionally, layout specifications for letters, numbers, words, and symbols and their size and position may be specified. Further, the jurisdictions' specifications may include dimensions for borders markings on the sign, which may have a height and width dimension. Jurisdictions may also specify dimensions of road markings on pavement of a road, for example. One example of a road marking is a bicycle lane marking. The jurisdiction may also specify dimensions (e.g., height and width) of a license plate or other identification element that is disposed on a vehicle. For instance, the width of a same type of traffic sign may vary depending on the type of road on which the traffic sign is located, such an expressway, a freeway, or a conventional road (which may include a residential road, a rural road, and so forth).

As one example, in the United States, the US Federal Highway Administration (FHWA) is a jurisdictional entity that may typically specify the width and height dimensions of various different types of traffic signs with respect to particular types of roads such as rural roads, highways, or roads in business, commercial, or residential areas. Accordingly, implementations herein may include one or more sign information data structures that store the height and width dimensions specified for various different types of traffic signs for various different geographic jurisdictions, such as various states within the United States, and/or various different countries in Europe, Asia, or other parts of the world in which the vehicle may be located. In some examples, the data structure may include information indicating the size and position of letters, words, numbers, symbols, and borders. Alternatively, this information may be stored in a separate data structure storing information about the size of the sign. Implementations herein may also include one or more road marking information data structures that store the size dimensions specified for various different types of road markings for various different geographic jurisdictions. Implementations herein may further include one or more license plate information data structures specified for various different types of license plates, for example, from various different jurisdictions. This database may include information obtained from various jurisdictional entities, such as the FHWA, state motor vehicle administrations, traffic authorities of other countries, and the like. As one example, within the United States, the Manual on Uniform Traffic Control Devices (MUTCD) may be used to determine specific information for sign placement, sizing, lettering, and so forth. The current MUTCD edition, the MUTCD 2009 edition with Revisions 1 and 2, updated Jan. 12, 2017, is available from the US FHWA and is incorporated herein by reference. Furthermore, in some cases, the database may include empirical information obtained for particular geographic jurisdictions, or the like.

According to some examples, herein, techniques for automatic calibration of calibration parameters of one or more cameras in a vision sensor system onboard a vehicle enable precise dimensional measurement of an object's size and distance from the camera. The camera calibration techniques herein facilitate improved three dimensional measurement accuracy using a traffic sign recognition system.

FIG. 1 illustrates an example of detecting a traffic sign according to some implementations. As shown in FIG. 1, a field of view 102 of one or more sensors, such as a camera, on board a vehicle 106 is wide enough to capture the road 104 in front of the vehicle 106, and objects, such as a traffic sign 108. In FIG. 1, X, Y, and Z may correspond to camera coordinates. Further, a distance $Z_1$ 110 indicates a distance between the traffic sign 108 and the one or more cameras 112 on board the vehicle 106. The one or more cameras 112 continuously capture images and after an image is captured, the image may be processed by the traffic sign recognition logic.

As one example, suppose the calibration system has recognized a traffic sign 108 and following the recognition of a type of the traffic sign 108, the calibration system may refer to a sign information data structure to determine at least one of an actual height and an actual width of the type of the traffic sign. The calibration system may also use other information, such as GPS information and map information, to determine a location of the vehicle to determine the actual dimensions of the sign type. For example, if the sign type of the traffic sign 108 is a stop sign, then the actual dimensions of the stop sign may depend on whether the stop sign is on a conventional road or an expressway. The GPS information and map information may be used to determine whether the sign identified is on a conventional road, a freeway, or an expressway, for example. After one or more of the actual dimensions of the traffic sign 108 are obtained, one or more of X direction, Y direction, and Z direction errors may be calculated, calibration parameters of the one or more cameras may be calculated, and the system may calibrate the one or more cameras using the calculated parameters for subsequent accurate measurement of 3-D objects detected within the field of view of the one or more cameras 112. In addition, while the examples above are described in the context of images captured by a camera, other types of sensors may be used in addition to, or as an alternative to, cameras, such as LIDAR, radar, and ultrasound sensors.

Figure 2:
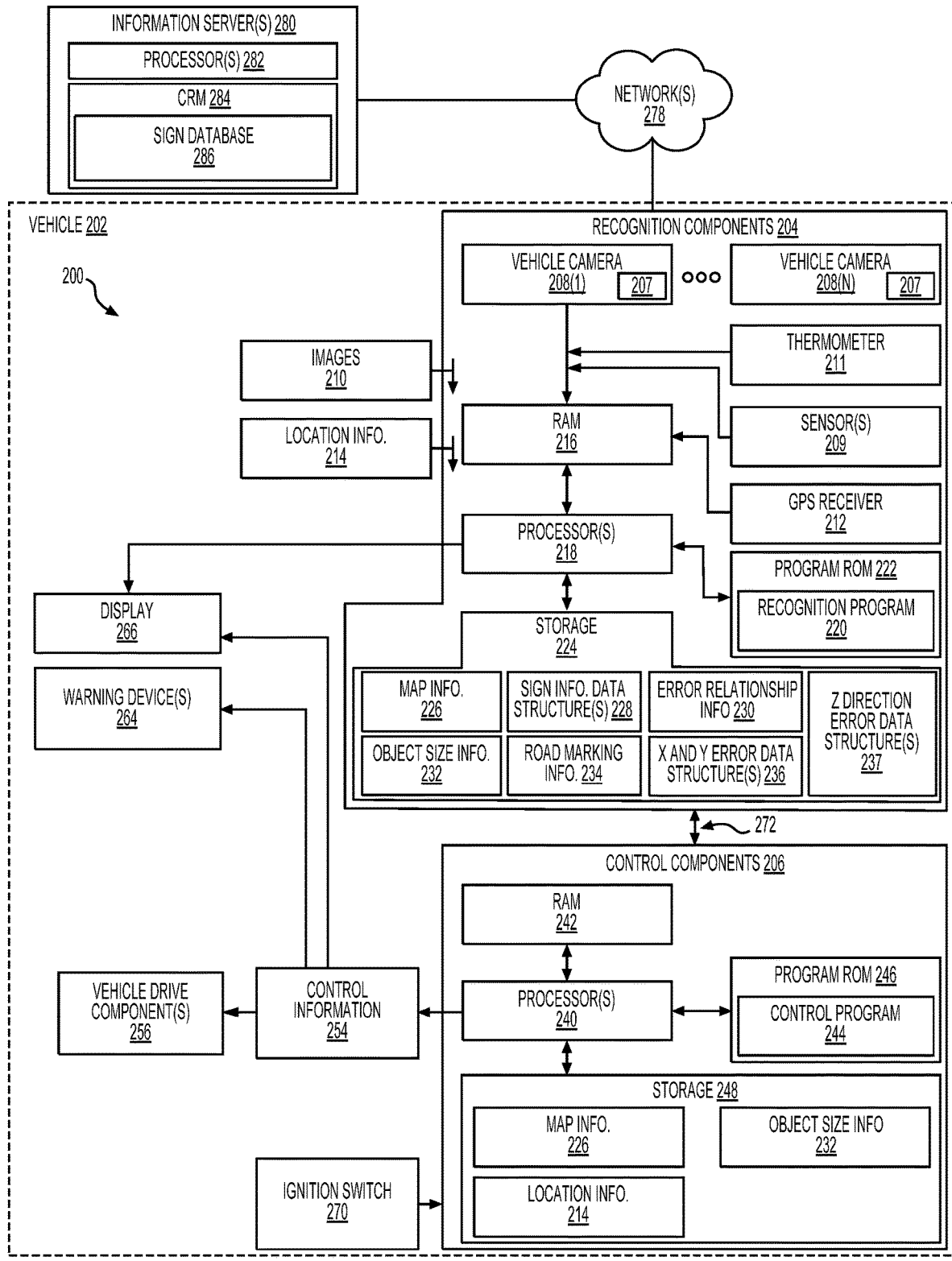
FIG. 2 illustrates an example architecture of a vision sensor system and vehicle control system that may be used for a vehicle according to some implementations.

FIG. 2 illustrates an example architecture of a vision sensor system and vehicle control system 200 that may be included in a vehicle 202 according to some implementations. The system 200 includes a plurality of recognition components 204 and a plurality of control components 206. The recognition components 204 may be used to detect and recognize a traffic sign and automatically calibrate parameters of one or more onboard sensors, such as vehicle camera 208(1)-208(N). Together, the recognition components 204 and the control components 206 may be used by the vehicle 202 for accurately measuring a three-dimensional size of an object and performing autonomous and/or semi-autonomous navigation along the road (e.g., collision avoidance), executing ADAS functions, or the like. Furthermore, while the recognition components 204 and control components 206 are shown separate from each other in this example, in other examples, some of these components may be combined, may be provided in different configurations, and/or some of the functionality may be provided by different components. Accordingly, implementations herein are not limited to the particular system and hardware configuration illustrated, and may be extended to various other configurations, as will be apparent to those of skill in the art having the benefit of the disclosure herein.

As mentioned above, the recognition components 204 may include one or more sensors, such as the one or more vehicle cameras 208(1)-208(N) in this example. For example, the vehicle camera(s) 208 may include a mono camera, a stereo camera, and/or multiple cameras, which may be mounted on the vehicle 202 in one or more locations. The vehicle cameras 208 may continually capture a plurality of images 210 of the vehicle's surroundings, such as in the forward-facing direction, the rear-facing direction, and the side facing directions. For instance, each camera 208 may capture a specified number of images 210 per second. In some examples, the rate of image capture may be related to the speed of the vehicle or other variables, while in other examples, the rate of image capture may be constant.

In some implementations, the camera may include one or more processors 207 that execute the measurement of 3D objects. Further, parameters of the camera 208 may be communicated to and received by the one or more system processors 218 for calibration parameter updating. In some examples, the one or more processors 218 perform the calculations for 3D measurement of a detected object. After calculating the calibration parameters and updating the parameters used to measure an object's size, the calibrated parameters may be communicated to the one or more processors 207 within the one or more cameras 208 from the one or more processors 218 for subsequent accurate 3D measurement of objects. Further, the camera parameter(s) may be communicated to the one or more processors 218 to be stored in storage 224 and may be previously stored in storage 224. In some implementations, the initial or factory calibration parameters may be obtained from an information server 280 via a network 278.

In addition, the recognition components 204 include a GPS receiver 212 able to continually receive location information 214 regarding the geographic location of the vehicle 202. One or more sensors 209 may also be included such as LIDAR, radar, ultrasound, and so forth. Further, the recognition components 204 may also include a temperature sensor 211 such as a thermometer. The images 210 captured by the cameras 208, the location information 214 from the GPS receiver 212, information from the one or more sensors 209, and information from a thermometer sensor 211 may be initially stored in RAM (random-access memory) 212 or other computer-readable medium (CRM). The images 210 and the location information 214 may be accessed by one or more processors 218 for performing the recognition function herein. For example, a recognition program 220 stored or otherwise maintained in a program ROM (read only memory) 222 or other CRM may be executed by the one or more processors 218 for detecting and recognizing an object and automatically calibrating camera parameters.

The recognition program 220 may include one or more algorithms as described herein that are executed by the one or more processors 218. Furthermore, during the execution of the recognition program 220, the recognition program 220 may access a storage 224, such as a memory or other CRM that includes data and/or data structures used by the recognition program 212. Examples of data and data structures used by the recognition program 220 include map information 226, one or more sign information data structures 228, one or more error relationship information data structures 230, one or more object size information data structures 232 of one or more objects detected by the vision sensor system, one or more road marking information data structures 234, one or more X direction and Y direction error information data structures 236, and one or more Z direction information data structures 237.

As discussed above, the recognition program 220 may be executed by the one or more processors 218 to recognize a roadside traffic sign, such as by determining the sign type of the traffic sign. After, the traffic sign is recognized, in some cases, camera parameters may be calibrated based on measured dimensions of the traffic sign (e.g., width and/or height) determined by the recognition program 220, information about the identified traffic sign included in the one or more sign information data structure 228, information included in the one or more error relationship information data structures 230, information included in the one or more object size information data structures 232, information included in the one or more road marking information data structures 234, information included in one or more X direction and Y direction error information data structures 236, and information included in the one or more Z direction information data structures 237. In some examples, the map information 226 and the geographic location information 214 may be used to determine a type of road upon which the vehicle 202 is traveling, which may be used to determine what type of road the vehicle is traveling on.

After the three-dimensional size information of an object has been determined, this information may be stored in one or more object size information data structures 232 and may be made available to the control components 206. The control components 206 may include one or more processors 240 and RAM 242. A control program 244 stored or otherwise maintained in a program ROM 246 or other CRM may be executed by the one or more processors 240 for performing control functions. For example, the control program 244 may access a storage 248 that includes the object size information 232, which may be used by the control program 244 for performing for one or more control functions. In some examples, the storage 248 may be the same as storage 224, such as a shared storage, e.g., a shared memory or other shared CRM. In other examples, the storage 248 may be separate from the storage 224.

Further, in some cases, the object size information 232 may be sent from the processor(s) 218 to the processor(s) 240 directly and stored in the RAM 242 for use by the control program 244. In addition, the storage 248 may store the location information 214 and various other types of data used by the control program 244. The three-dimensional size information 232 of an object may indicate X direction, Y direction, and Z direction values. Based on at least the object size information 232, the control program 244 may generate control information 254, which may include one or more of control signals sent to one or more vehicle drive components 256, such as braking, steering, throttle, or the like. Additionally, the control information 254 may include warning signals sent to one or more warning devices 264, information presented on a display 266 along with the images 210, or other information.

Furthermore, a condition of an ignition switch 270 may be an indicator to the recognition program 220 and/or the control program 244 of whether to perform automatic camera calibration. For instance, a series of processing operations may be initiated when the ignition switch 270 is turned on, and may be repeatedly performed until the ignition switch 270 is turned off. In some cases, the series of processing operations may be performed regardless of whether the vehicle 202 is traveling or stopped. For example, when the ignition switch 270 is turned on, the recognition program 220 may begin execution of one or more processes, such as by using the cameras 208 to capture images 210, and analyzing the captured images 210 to detect and recognize a traffic sign or other objects. In some cases, the cameras 208 may be used to continually capture images 210 while the ignition switch is in the on position.

In some examples, the processor(s) 218 and/or 240 may be processors included in one or electronic control units (ECUs) in the vehicle 202. For example, ECU is a generic term for any embedded system that controls one or more of the systems, subsystems, or components in a vehicle. Each ECU may include one or more processors, a memory, and digital and/or analog communication interfaces (not shown in FIG. 2). Software, such as the recognition program 220 and the control program 244, for execution by a particular ECU, may be stored in a portion of the memory (e.g., program ROM) associated with the respective ECU to enable the ECU to operate as an embedded system. ECUs may typically communicate with each other over a vehicle bus 272 according to a vehicle bus protocol. As an example, the Controller Area Network bus (CAN bus) protocol is a vehicle bus protocol that allows ECUs and other devices to communicate with each other without a host computer. CAN bus may include at least two different types. For example, high-speed CAN may be used in applications where the bus runs from one end of the environment to the other, while fault-tolerant CAN is often used where groups of nodes are connected together. Alternatively, in some examples, the processors 218 and/or 240 may include other types of computing devices, such as central processing units (CPUs), graphics processing units (GPUs), microprocessors, microcomputers, microcontrollers, digital signal processors, state machines, logic circuitries, or the like.

In addition, the storages 224 and 248 may include, but are not limited to, RAM, ROM, EEPROM, flash memory, or other memory technologies, optical storage, solid state storage, magnetic device storage, or any other medium that can be used to store the desired information and that can be accessed by a computing device. Depending on the configuration of the recognition components and the control components, the storages 224 and 248 may be a type of computer-readable storage medium and/or may be a tangible non-transitory medium to the extent that when mentioned, non-transitory computer-readable media exclude media such as energy, carrier signals, electromagnetic waves, and/or signals per se.

In addition, in some implementations, the recognition program 220 or other program executed in the vehicle 202 may be configured to communicate over one or more networks 278 with one or more information servers 280. The information server(s) 280 may include one or more processors 282 and one or more CRM 284. For example, the sign information data structures 228, the error relationship information data structure 230, and road marking information data structure 234, may be stored in the CRM 284 and may be accessible over network 278 by the recognition program 220. Further, the information server(s) 280 may maintain a sign database 286, and may send the sign information data 228 to the processors 218 of the recognition components 204.

The vehicle 202 may be able to communicate wirelessly with the one or more networks 278, or, in some cases, through a wired connection. The one or more networks 278 may include any type of network, including a wide area network (WAN), such as the Internet; a wireless network, such as a cellular network, a local wireless network, such as Wi-Fi, and/or short-range wireless communications; a wired network including fiber optics, Ethernet, or any other such network, a direct wired connection, or any combination thereof. Accordingly, the one or more networks 278 may include both wired and/or wireless communication technologies. Components used for such communications can depend at least in part upon the type of network. Protocols for communicating over such networks are well known and will not be discussed herein in detail. Accordingly, the vehicle 202 and the information server(s) 280 are able to communicate over the one or more networks 278 through wireless connections, and combinations of wireless and wired connections.

In some examples, the one or more information servers 280 may include one or more servers or other types of computing devices that may be embodied in any number of ways. For instance, in the case of a server, the functional components and data storage may be implemented on a single server, a cluster of servers, a server farm or data center, and so forth, although other computer architectures may additionally, or alternatively, be used.

Each processor 282 may be a single processing unit or a number of processing units, and may include single or multiple computing units, or multiple processing cores. The processor(s) 282 can be implemented as one or more central processing units, microprocessors, microcomputers, microcontrollers, digital signal processors, state machines, logic circuitries, graphics processing units, and/or any devices that manipulate signals based on operational instructions. For instance, the processor(s) 282 may be one or more hardware processors and/or logic circuits of any suitable type specifically programmed or configured to execute the algorithms and processes described herein. The processor(s) 282 may be configured to fetch and execute computer-readable instructions stored in the CRM 284, which can program the processor(s) 282 to perform the functions described herein.

The CRM 284 may include volatile and nonvolatile memory and/or removable and non-removable media implemented in any type of technology for storage of information, such as computer-readable instructions, data structures, programs, or other data. For example, the CRM 284 may include, but is not limited to, RAM, ROM, EEPROM, flash memory or other memory technology, optical storage, solid state storage, magnetic tape storage, magnetic disk storage, RAID storage systems, storage arrays, network attached storage, storage area networks, or any other medium that can be used to store the desired information and that can be accessed by a computing device. Depending on the configuration of the information server 280, the CRM 284 may be a type of computer-readable storage media and/or may be a tangible non-transitory media to the extent that when mentioned, non-transitory computer-readable media exclude media such as energy, carrier signals, electromagnetic waves, and/or signals per se. Further, the computing device 280 may include many other logical, programmatic, and physical components, of which those described above are merely examples that are related to the discussion herein.

Further, while FIG. 2 illustrates the components and data of the information server(s) 280 as being present in a single location, these components and data may alternatively be distributed across different computing devices and different locations in any manner Consequently, the functions may be implemented by one or more computing devices, with the various functionality described above distributed in various ways across the different computing devices.

Figure 3:
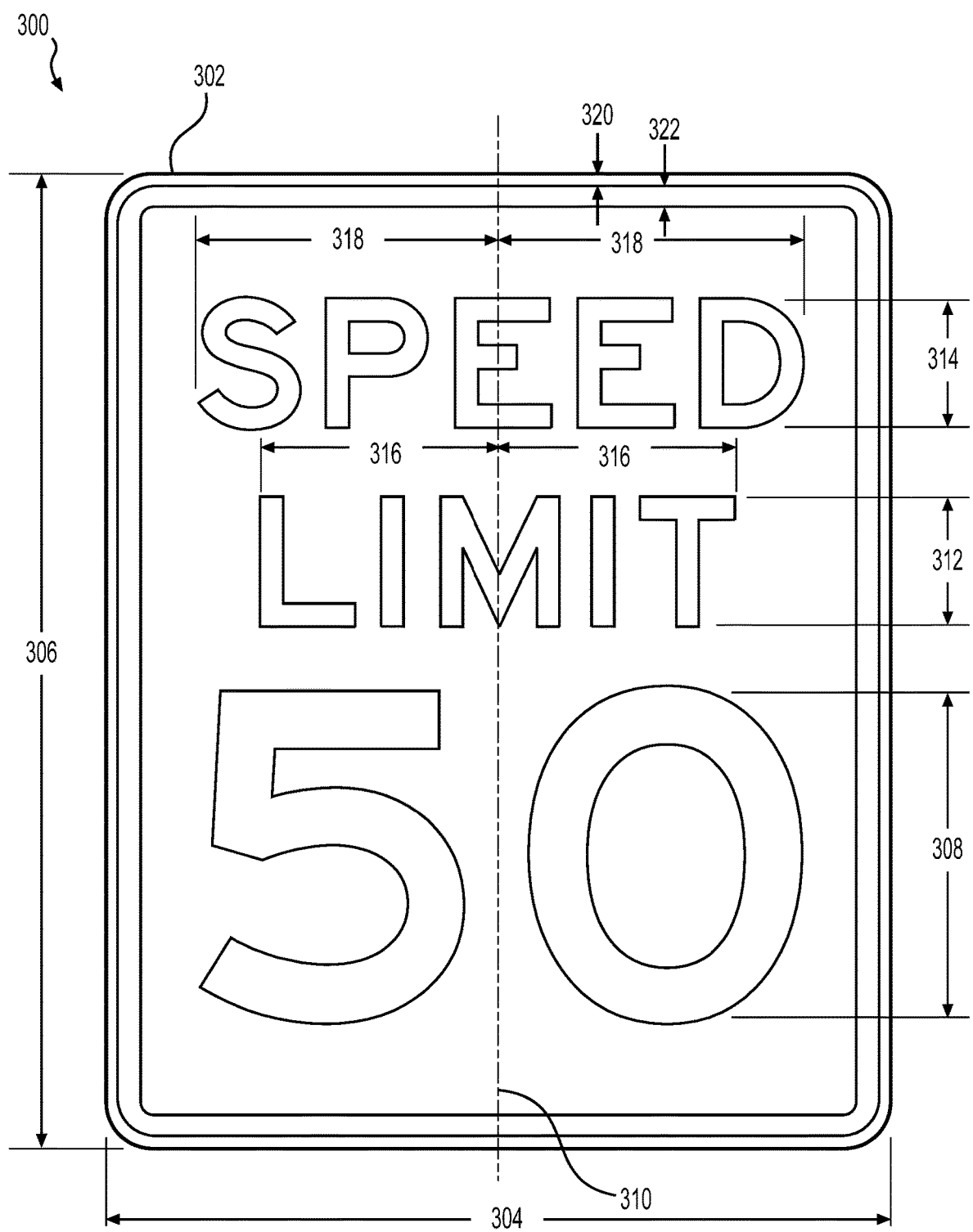
FIG. 3 illustrates an example specification obtained from a jurisdictional entity for a speed limit sign according to some implementations.
Figure 4:
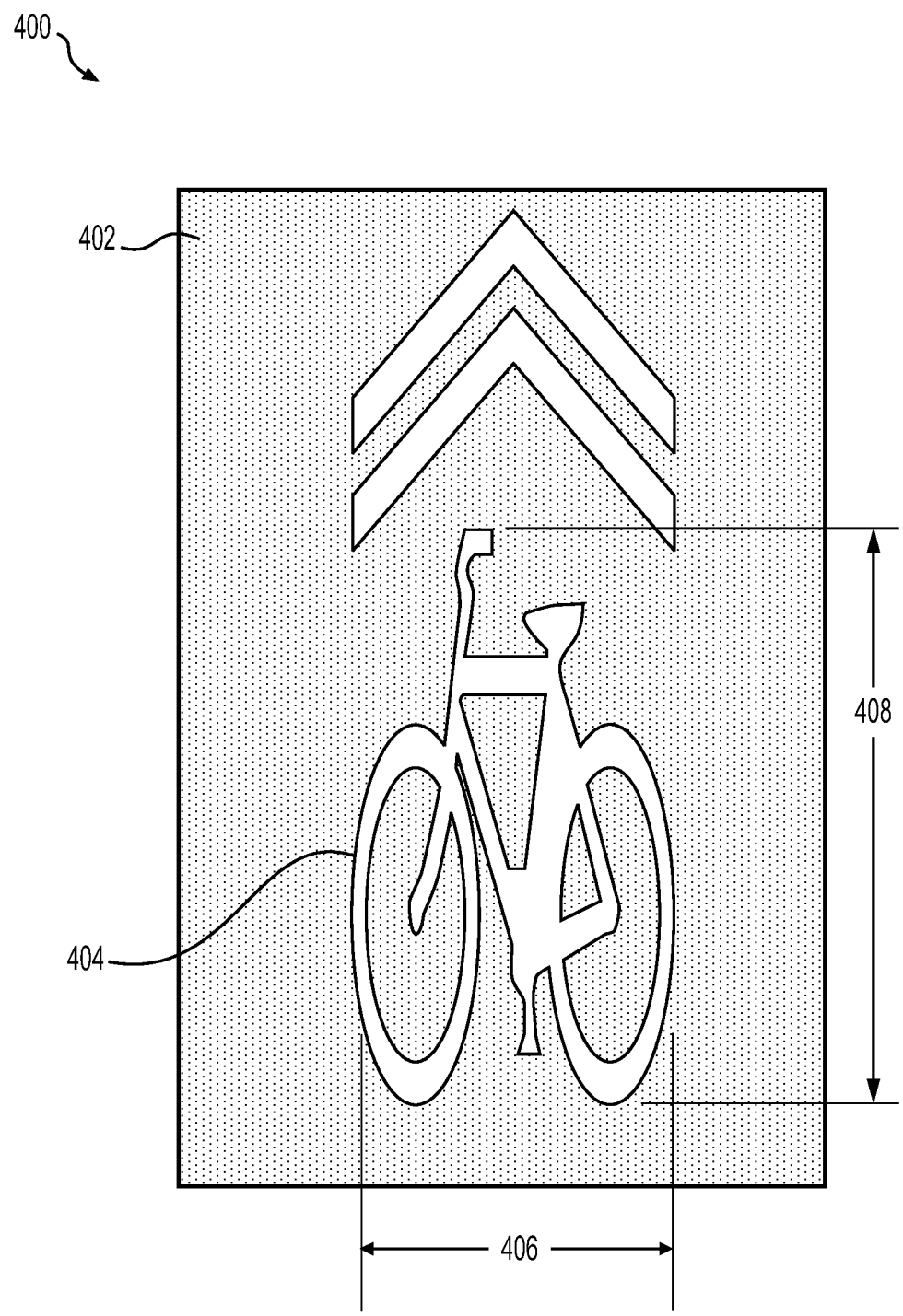
FIG. 4 illustrates an example specification obtained from a jurisdictional entity for a road marking according to some implementations.

FIGS. 3 and 4 illustrate examples of traffic sign information available from a jurisdictional entity according to some implementations. For instance, as discussed above with respect to FIG. 2, the information server 280 may obtain information from various different jurisdictions for compiling the sign database 286 of sign dimension and sign layout specification information, such as the position and distance specifications for the width and height of a sign and the spacing, position, and dimensions of the letters, numbers, words, symbols, or borders on the sign. One source of such information is the "Manual on Uniform Traffic Control Devices" (MUTCD) issued by the FHWA. The MUTCD contains recommended configurations for traffic control devices in the United States.

FIG. 3 illustrates an example specification 300 obtained from a jurisdictional entity for a speed limit sign 302 according to some implementations. In this example, the numerical values are in inches. For example, the width dimension 304 of a speed limit sign may be 24 inches and a height dimension 306 may be 30 inches. The width dimension 302 may correspond to an X direction and the height dimension 306 may correspond to a Y direction. A dimension indicating a height of the numbers (e.g., "5" and "0") 308 may be 10 inches. As shown, a centerline 310 indicates a center of the sign and the words, such as "SPEED" and "LIMIT" are centered on the sign in the X direction. Accordingly, a total width of a word can be determined based on a dimension 318 indicating a measurement of an outside edge of a letter of the word from the centerline 310. For example, the word "SPEED" may be centered on the centerline 310 and the left side edge of the letter "S" may be 9.563 inches from the centerline 310 as denoted by reference numeral 318. Accordingly, a width dimension of the word "SPEED" may be 19.126 inches. Further, a height dimension of the word "SPEED" 314 may be 4 inches. The dimensions of "LIMIT" may be similarly determined based on dimensions 312 and 316. Additionally, the specifications of a traffic sign may include a dimension of a border 322, such as a height dimension or a width dimension, and a specification indicating a dimension from the outside edge of the border to the actual edge of the traffic sign 320 in the height or Y direction.

FIG. 4 illustrates an example specification 400 obtained from a jurisdictional entity for a road marking 404 according to some implementations. In this example, a road marking 404 indicates a bicycle lane. As a vehicle travels on a road 402, the vehicle will approach the road marking 404 and eventually pass over the road marking 404. For example, a dimension 408 may be 72 inches and may correspond to a Z direction. Further, a width dimension 406 may be 40 inches and may correspond to an X direction. Accordingly, once recognized by the recognition program, road markings 404 may also be used to calibrate the camera parameters in a similar way to using the width and height dimensions of a traffic sign. Further, as the vehicle approaches the lane marking 404, the dimension 408 may be measured and may be useful for calibrating a Z direction error, which, as explained in more detail below, is used to calculate calibration parameters of one or more cameras on board a vehicle.

FIG. 5 illustrates an example sign information data structure 228 for storing sign information according to some implementations. In this example, the sign information data structure includes sign information for a plurality of geographical jurisdictions, including a first jurisdiction 502 and a second jurisdiction 504. As mentioned above, the sign size (width and height dimensions), letter, word, number, symbol, and border layout dimensions and spacing may be different for the same sign type depending on the type of road on which the sign is located. For example, the type of road may be a conventional road, expressway, or a freeway. By way of example, the dimension information shown in FIG. 5 is for a conventional road. For example, the data structure 228 may include a sign type 506, a sign width 508, a sign height 510, a number height 512, a letter height 514, a dimension indicating a measurement from the center line for a first word 516, and a dimension indicating a measurement from the center line for a second word 518.

In the example data structure 228 for storing sign information, the information indicating the dimensions is represented in inches. For example, a speed limit sign type on a conventional road is 24 inches wide and 30 inches in height. Further, the layout specification information of the sign may indicate that the number height of the speed limit numbers is 10 inches, the letter height of the letters of one or more words is 4 inches, a first word may be 9.563 inches offset from a center line of the sign, and a second word may be 7.313 inches offset from a center line of the sign. Specifications for a traffic sign as determined by a jurisdiction may also include a dimension of a border around the outside of the numbers and letters of the sign 520 and a dimension indicating a distance between the outside of the border and the actual edge of the sign 522. The dimensions for the border 520 and outside edge of border to edge of sign 522 may be equal in the width and height directions. Although not shown in the data structure 228, the specifications may also indicate colors for specific areas of the sign such as the border, etc., which may be useful in determining edges of respective letters, words, numbers, symbols, and borders based on pixel processing, or the like.

In some examples, the information entered in the data structure 228 may be initially obtained from a jurisdictional entity, such as the FHWA or state motor vehicle departments in the United States, or similar entities in other countries. The information may be subsequently supplemented, changed, or otherwise updated. Further, while FIG. 5 illustrates one example of a data structure 228 for storing sign information, numerous other data structures, databases, types of data stored, and the like, will be apparent to those of skill in the art having the benefit of the disclosure herein. Further, as mentioned above, the data structure 228 for storing sign information may be acquired from the information server 280. Additionally, in some cases, the data structure 228 may include license plate dimension information for each jurisdiction as well.

FIG. 6 illustrates an example road marking information data structure 234 for storing road marking information according to some implementations. In this example, the road marking information data structure 234 includes road marking information for a plurality of geographic jurisdictions, including a first jurisdiction 602 and a second jurisdiction 604. For example, the data structure 234 may include road mark type 606, and dimensions of the road marking 608, such as a width dimension and a depth or distance dimension, which may correspond to a Z direction. Similar to the sign information data structure, 228, the information may be initially obtained from a jurisdictional entity, such as the FHWA or state motor vehicle departments in the United States, or similar entities in other countries. Further information may be obtained from an information server 280. For example, the width of a bicycle marking may be 40 inches and may correspond to an X direction. Further, a depth or distance measurement may indicate how many inches the marking spans on the road in the direction of travel of the vehicle. Further, while FIG. 6 illustrates one example of a data structure 234 numerous other data structures, databases, types of data stored, and the like, will be apparent to those of skill in the art having the benefit of the disclosure herein. Further, as mentioned above, the data structure 234 may be acquired from the information server 280.

Figure 7:
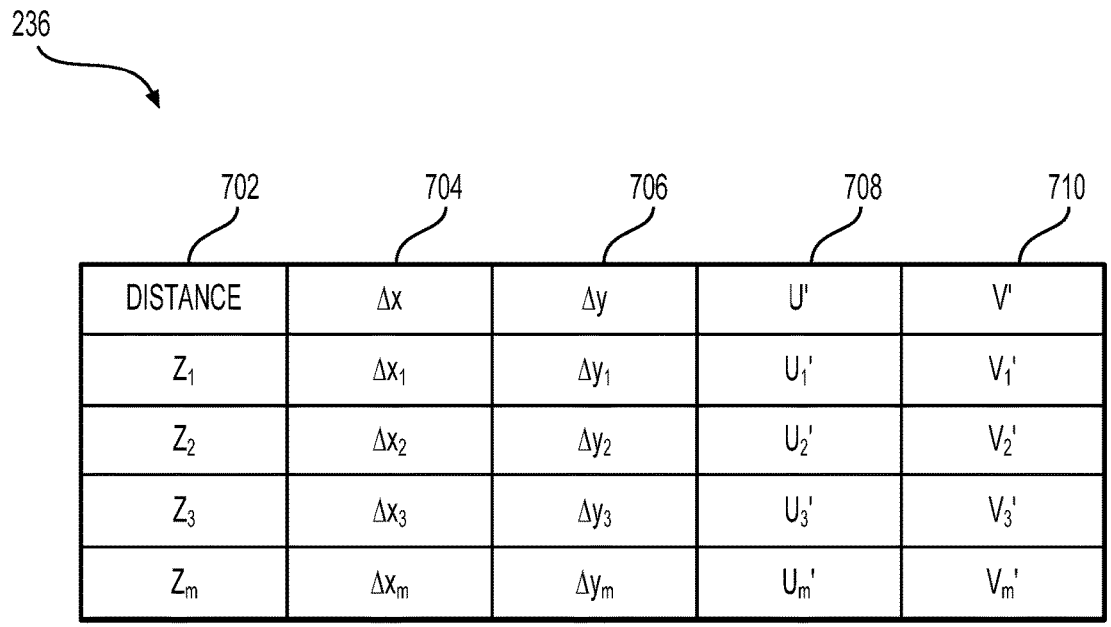
FIG. 7 illustrates an example of a data structure for storing calculated X direction and Y direction errors for each distance measured of a recognized traffic sign according to some implementations.

FIG. 7 illustrates an example of a data structure 236 for storing calculated X direction and Y direction errors for each distance (e.g., $Z_1$) measured of a recognized traffic sign according to some implementations. For example, for a given measured distance 102 of a traffic sign from a camera on board a vehicle, an error in an X direction $\Delta x$ 704 and an error in a Y direction $\Delta y$ 706 is calculated and stored in the data structure 236. Further, parameters u' 708 and v' 710 which are functions of $\Delta x$ and $\Delta y$, respectively, are calculated and stored in the data structure 236. In some instances, the data structure may be a lookup table. Further, while FIG. 7 illustrates one example of a data structure 236 numerous other data structures, databases, types of data stored, and the like, will be apparent to those of skill in the art having the benefit of the disclosure herein.

Figure 8:
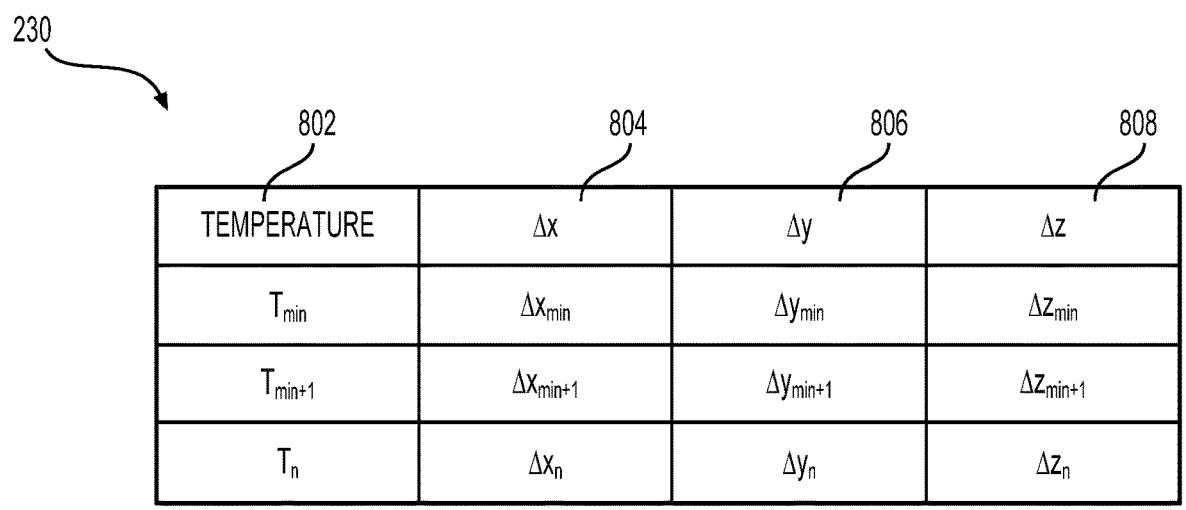
FIG. 8 illustrates an example of a data structure for storing information about a relationship between an X direction error, a Y direction error, and a Z direction error according to some implementations.

FIG. 8 illustrates an example of an error relationship information data structure 230 for storing information about a relationship between a Z direction error, an X direction error and a Z direction error based on temperature according to some implementations. The error relationship data structure 230 includes determined Z direction errors $\Delta z$ 808 that correspond with at least one of an X direction error $\Delta x$ 804 and a Y direction error $\Delta y$ 806 at a plurality of temperatures 802 based on prior experimentation, for example. For example, the Z direction error information $\Delta z$ 808 may be pre-defined, and for example, the relationship among the error along the Z direction $\Delta z$ 808 with the $\Delta x$ 804 and $\Delta y$ 806 may be calculated and may be determined by prior experimentation. For example, the relationship of $\Delta z$ with $\Delta x$ and $\Delta y$, may be evaluated for a plurality of temperatures within a given range from $T_{min}$ to $T_n$. At a certain temperature, a Z direction error may be a function of $\Delta x$ and $\Delta y$. Accordingly, the pre-experiment correlation information as stored in the data structure 230 may be used to calculate the error along the Z direction $\Delta z$ using the stored calculated error relationship among a Z direction error and the errors along the X direction $\Delta x$ and the Y direction $\Delta y$. In other words, once $\Delta x$ and $\Delta y$ are calculated, $\Delta z$ may be determined based on the information stored in the error relationship information data structure 230.

FIG. 9 illustrates an example of a data structure 237 that stores information for the calculated errors of each of the X, Y, and Z directions for each measured distance (e.g., $Z_1$, $Z_2$, etc.) from the camera to the traffic sign according to some implementations. For example, the data structure 237 is generated based on the calculation results for each of Δx 904, Δy 906, and Δz 908 for each distance 702. As illustrated, updated Z information 910 includes the measured distance corrected by an error calculation result Δz. Further, while FIG. 9 illustrates one example of a data structure 237 numerous other data structures, databases, types of data stored, and the like, will be apparent to those of skill in the art having the benefit of the disclosure herein.

Figure 10:
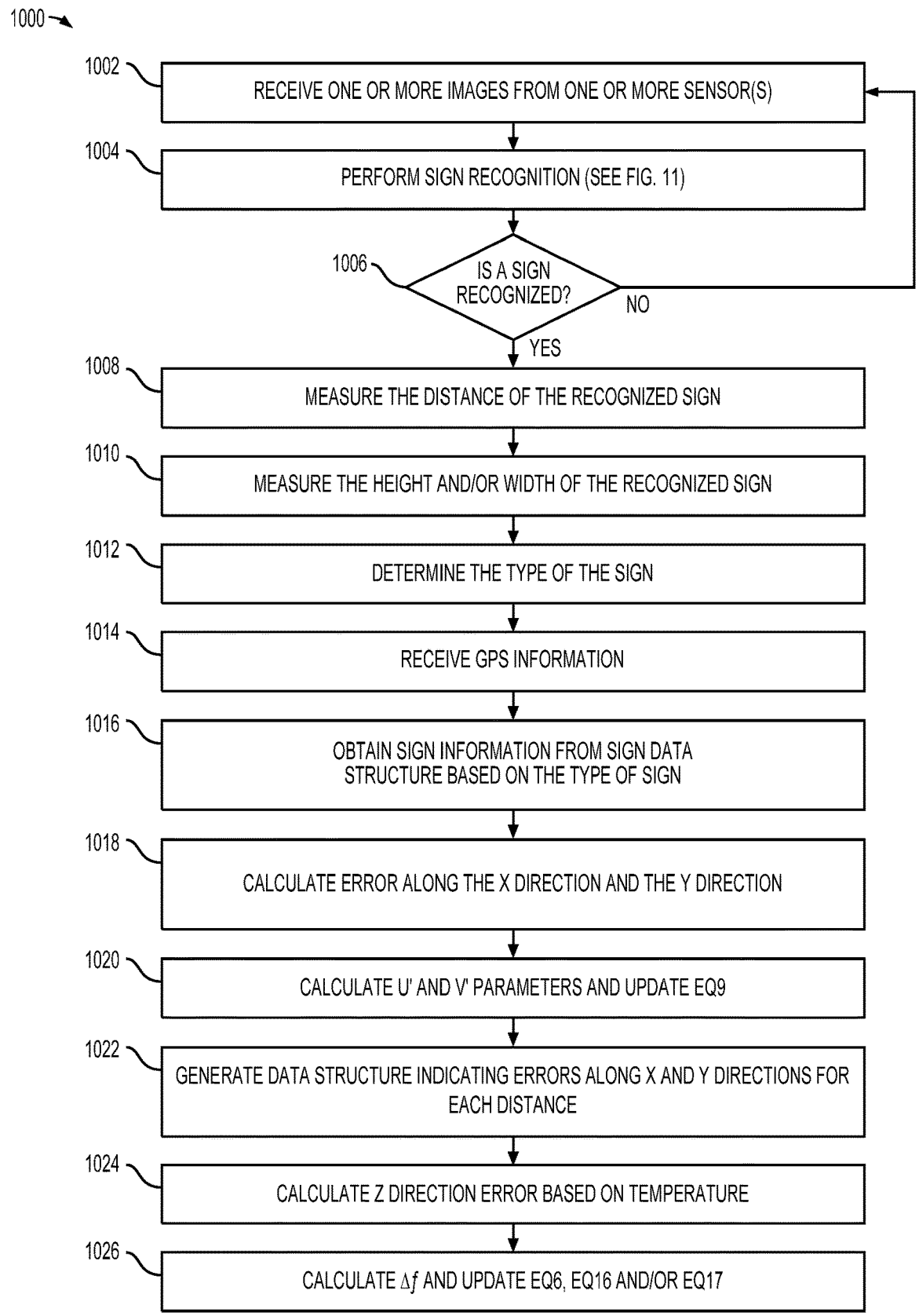
FIG. 10 is a flow diagram illustrating an example process for calibrating parameters of a camera according to some implementations.
Figure 11:
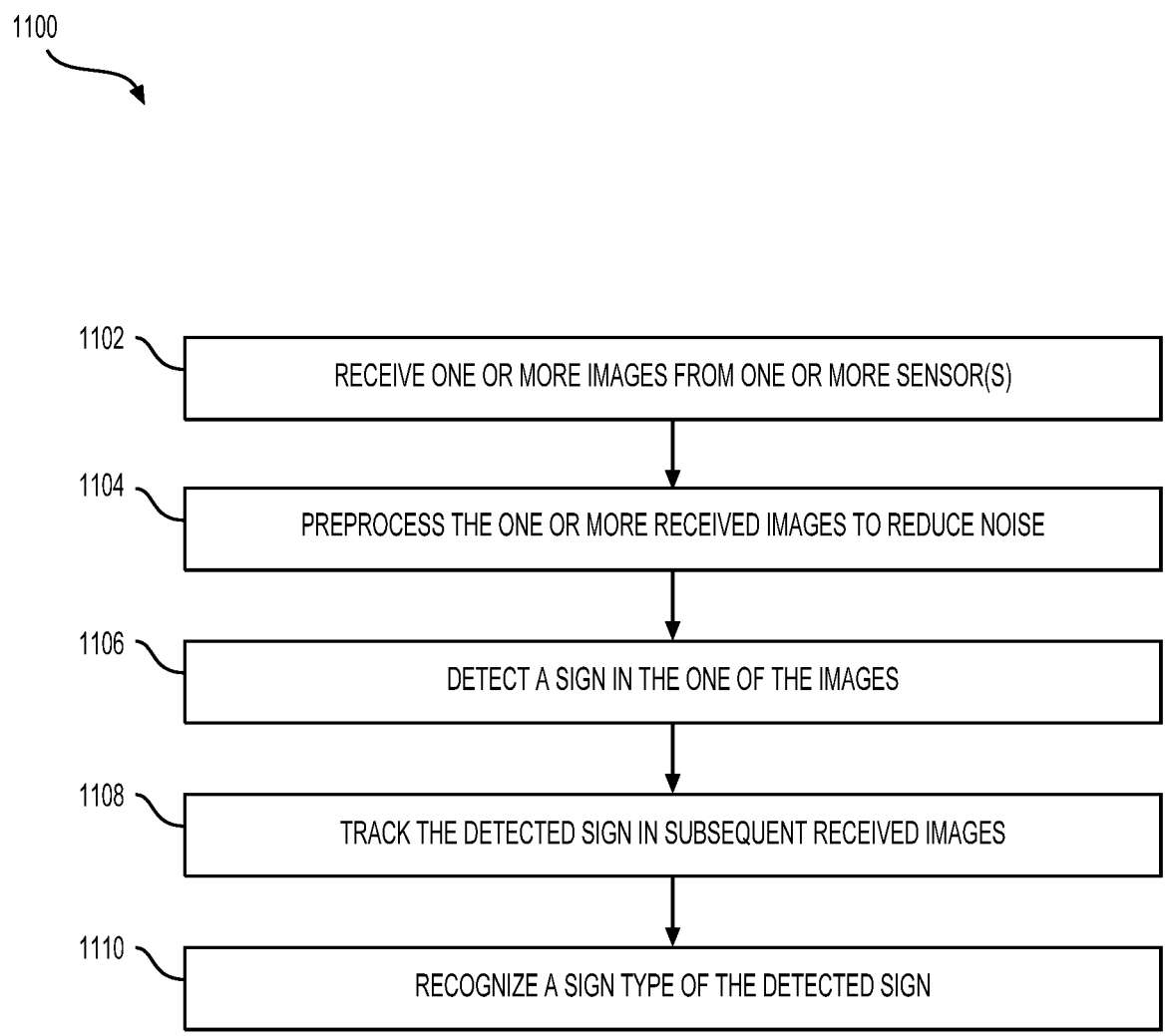
FIG. 11 is a flow diagram illustrating an example process for recognizing a traffic sign according to some implementations.

FIGS. 10 and 11 illustrate example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 10 is a flow diagram illustrating an example process 1000 for calibrating parameters of a camera according to some implementations. In some examples, the process 1000 may be performed by one or more processors executing the recognition program and the control program. After an image is captured, the recognition program may be executed to detect a sign and recognize of a type of the sign. Further, a Z direction distance from the camera on board the vehicle to the sign is measured and the width and height of the recognized sign is measured. In general, if a sign is detected and recognized, the sign information data structure is accessed to determine errors along the X and Y directions to calculate a Z direction error so that the parameters of the camera can be calibrated, as described in more detail below.

Further, implementations herein may detect and recognize signs on the both sides of a road. For instance, the sign type of traffic signs typically may be recognized by the shape of the sign. Further, the back of a traffic sign may usually be distinguished from the front based on the presence of text or symbols, or lack thereof, the location of a pole or other support, and so forth. Further, in some cases for determining a lateral distance from the recognized sign, the system may generate a 3D depth map from one or more images captured by one or more sensors and/or based on parallax determined between two images obtained from different perspectives, such as by using a stereo camera, multiple cameras, or multiple images taken at different points in time, e.g., as the vehicle moves at a known velocity.

At 1002, the one or more processors may receive one or more images from one or more sensors. For example, in the case that the sensors include one or more stereo cameras, the images may be obtained using visible light, infrared light, or both. Further, the one or more images may be obtained additionally, or alternatively, using other sensing technologies, or combinations thereof, such as LIDAR, radar, ultrasound, and so forth.

At 1004, the one or more processors may perform sign recognition using the one or more images. An example sign recognition algorithm and process is discussed additionally below with respect to FIG. 11.

At 1006, the one or more processors may determine whether a sign is recognized. If a sign is recognized, the process may proceed to block 1008. If not, the process may return to block 1002 to receive one or more additional images.

In some cases, multiple signs may be present at the same distance from the camera onboard the vehicle, such as when multiple signs are attached to the same sign post. In this case, the one or more processors may select one traffic sign to measure to subsequently calibrate the parameters. A traffic sign having an edge that is easier to detect based on pixel intensity, for example, among the multiple signs at the same distance will be used. As one example, a data structure storing preference information indicating a preference or priority of a type of sign to use for the calibration may be referred to. In this case, the data structure may be a list indicating which sign types are preferable based on ease of edge detection and/or accuracy of edge detection of various traffic sign types. Accordingly, in the case that there are multiple traffic signs at the same distance, the list may be referred to select one traffic sign for the calibration process herein.

In some cases, the camera may image multiple traffic signs at different distances from the camera in one or more images. In this case, two or more recognized traffic signs may be used for the calibration process herein and each of the calculations as discussed below are performed for each recognized traffic sign independently.

At 1008, the distance of the recognized sign from the one or more cameras is measured. For example, a distance $Z_1$ may be calculated, which indicates a distance between the camera onboard the vehicle and the recognized traffic sign. A distance measurement technique can be implemented as follows.

Figure 12:
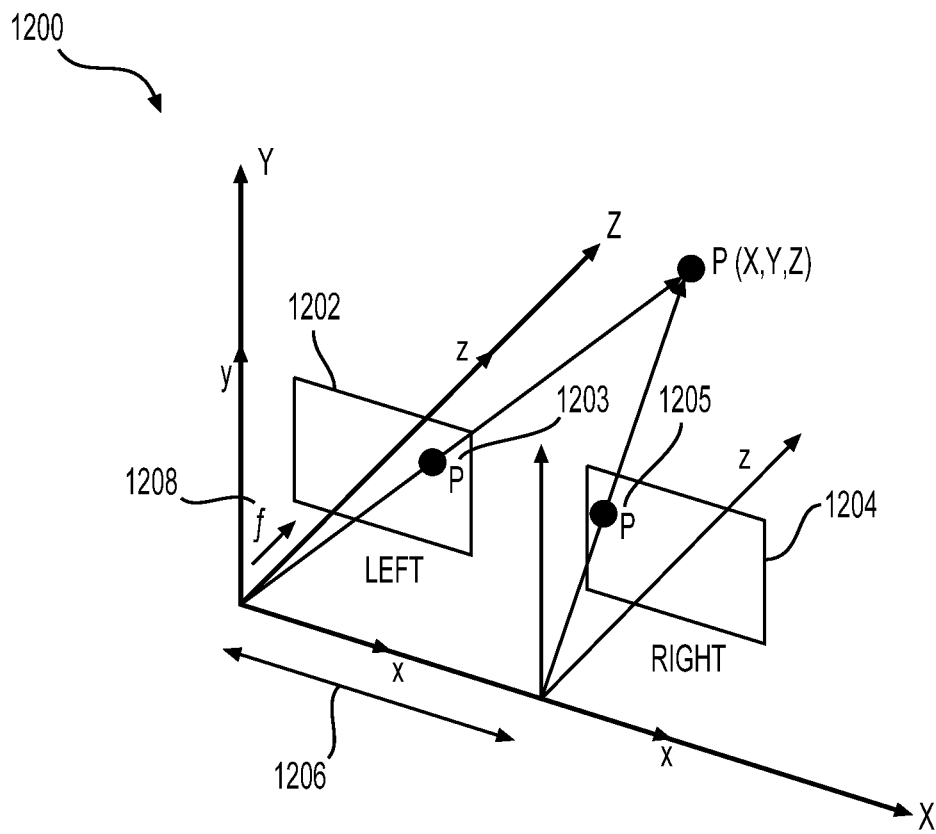
FIG. 12 illustrates an example of determined image coordinates according to some implementations.

For example, FIG. 12 is an illustration of a schematic diagram 1200 of a camera having apertures at a distance b 1206 (or two cameras, each having an aperture at a distance b). For instance, a first image (i.e., left image) 1202 is taken by a first camera or through a first aperture of a stereo camera and a second image (e.g., right image) 1204 is taken by a second camera or through a second aperture of a stereo camera. In FIG. 12, b 1206 and f 1208 indicate a base distance between the two lenses (or two cameras) and the focal length of the camera, respectively. The point P may be a real-world point defined by coordinates X, Y, and Z, as shown.

Image coordinates of any point p 1203 in the left-side image 1104 may be calculated using the following equations:

$$x_l = f\frac{X}{Z} \tag{EQ 1}$$

$$y_l = f\frac{Y}{Z} \quad (EQ\ 2)$$

In EQ1, $x_l$ indicates an x image coordinate, and in EQ2, $y_l$ indicates a y image coordinate. Similarly, image coordinates of any point p 1205 in the right-side image 1106 may be calculated using the following equations:

$$x_r = f\frac{X-b}{Z} \quad (EQ\ 3)$$

$$y_r = f\frac{Y}{Z} \quad (EQ\ 4)$$

In EQ3, $x_r$ indicates an x image coordinate and in EQ4, $y_r$ indicates a y image coordinate. Further, a stereo disparity d may refer to the difference of coordinates along the x-axis of the point p in the left image 904 and the right image 906. Disparity d may be calculated using the following equation:

$$d = x_l - x_r = f\frac{b}{Z} \quad (EQ\ 5)$$

In 1008, the calculated disparity may be used to measure the distance from the camera to the traffic sign along the Z direction. Thus, the distance of the recognized traffic sign from the camera can be calculated using the following equation:

$$Z_1 = Z_{camera} = \frac{f \times b}{d \times \delta} \quad (EQ\ 6)$$

In EQ6, $\delta$ indicates an image sensor pixel size.

Blocks 1002-1008 may be repeated and each instance of a measured distance of a recognized sign is recorded or stored. Therefore, the calculated distance $Z_1$ is stored and subsequent calculated distances (e.g., $Z_2, \ldots Z_n$) may be calculated and stored. Additionally, or alternatively, other computer vision techniques may be used to determine the position of a sign relative to the vehicle's frame of reference, such as based on the position of the sign in a captured image, the size of the sign relative to the field of view of the image, a change in size and position of the sign in the field of view from one image to the next image as the vehicle advances at a known speed, and so forth.

In some instances, the one or more processors may calculate a disparity map of the two images that include the traffic sign and evaluate disparity values of the disparity map to determine whether the disparity is reliable enough to use in calculating the distance. For example, if one or more disparity values are greater than or equal to a predetermined threshold, then the disparity map may be reliable. If the disparity map is determined to be reliable, then disparity is used to calculate the distance of the recognized traffic sign from the camera. Further, if the disparity map is determined not to be reliable, then the disparity of respective regions of the two images (e.g., left and right images) that include the recognized traffic sign are calculated to be used in the distance calculation.

At 1010, the height h and width w of the recognized traffic sign are measured. The width w and height h of a recognized traffic sign may be measured by examining the border line and color information of the border pixels of the traffic sign. The edge of the sign, border, and/or corner points may be measured by examining pixel intensity and color information of the recognized sign and the neighboring pixels. Some jurisdictions may specify the color and size of one or more borders of the traffic signs.

In some implementations, one or more dimensions (e.g. height and/or width) or a position, of one or more letters, numbers, words, symbols, or borders of a sign are measured. For example, a width and height of the numbers indicating the speed limit of a speed limit type traffic sign may be measured. Additionally, the recognition logic may determine that a traffic sign is damaged or distorted and therefore one or more of the height and width of the traffic sign may not be measured accurately. In this case, a size, position, or other position information of one or more letters, words, symbols, borders, or numbers of the sign may be measured.

Figure 13:
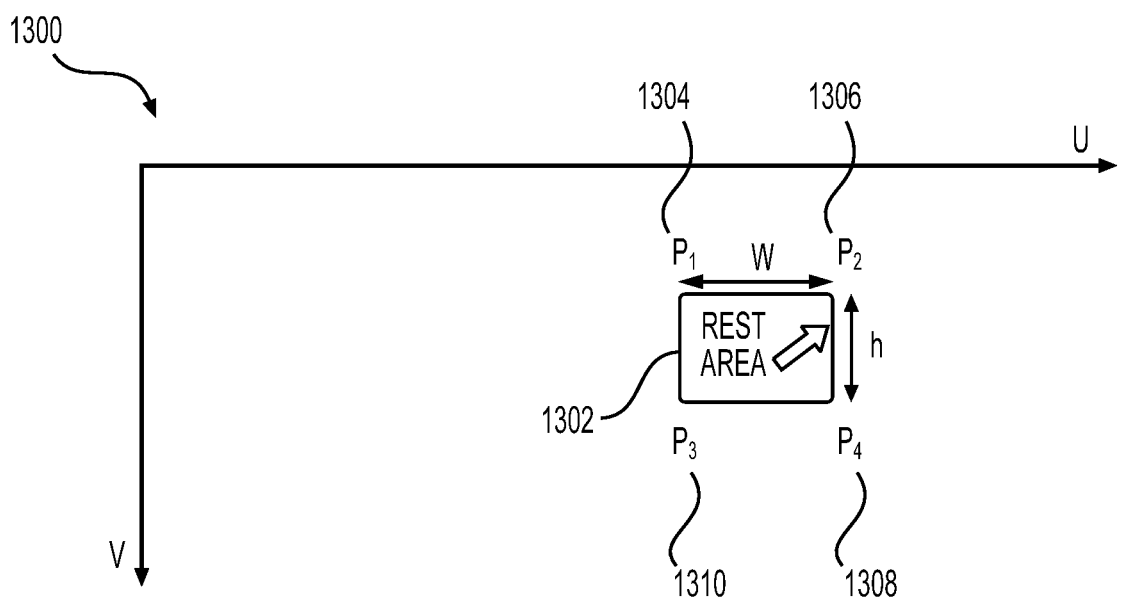
FIG. 13 illustrates an example of recognizing a traffic sign according to some implementations.

In some implementations, dimension (e.g., a Z direction and a width) of a road marking may be measured. Further, a Z direction measurement of a road marking may be used to directly calculate a Z direction measurement. Accordingly, dimensions of a road marking could be measured and used in combination with the measured dimensions of a traffic sign. Further, dimensions (e.g., height and width) of a license plate may be measured and the techniques described herein may be applied accordingly for those measurements For example, FIG. 13 illustrates an image 1300 including a recognized traffic sign 1302 according to some implementations. Using the techniques described above, corners of a traffic sign 1302 may be recognized with (u, v) image coordinates. For instance, the u-v coordinate system may be used for mapping between 2D and 3D coordinates. In this example, the traffic sign 1302 is a quadrilateral and therefore has four corners. However, traffic signs may be of other shapes, such as circular, triangular, octagonal, etc. and the techniques for size measurement disclosed herein may apply to measuring signs of different shapes. The four corners may be indicated as $P_1$ ($u_1$, $v_1$)1304, $P_2$ ($u_2$, $v_1$) 1306, $P_3$ ($u_1$, $v_2$) 1308, and $P_4$ ($U_2$, $v_2$) 1310. Considering image coordinates (u, v) and the above equations (EQ 1-6), the width w and height h of the traffic sign 1002 can be calculated using the following equations:

$$w = P_2 - P_1 = X_{1camera} - X_{1camera} = \frac{u_2 \times Z_{camera}}{f} - \frac{u_1 \times Z_{camera}}{f} \quad (EQ\ 7)$$

$$h = P_3 - P_1 = Y_{3camera} - Y_{1camera} = \frac{v_2 \times Z_{camera}}{f} - \frac{v_1 \times Z_{camera}}{f} \quad (EQ\ 8)$$

Further, the calculations to calculate the distance of the sign (e.g., $Z_1$), the height h of the traffic sign, and width w of the traffic sign may be determined in matrix form as shown in the following equations:

$$\begin{pmatrix} x' \\ y' \\ z' \\ w' \end{pmatrix} = \begin{pmatrix} 1 & 0 & 0 & 0 \\ 0 & 1 & 0 & 0 \\ 0 & 0 & 0 & \frac{f}{\delta} \\ 0 & 0 & \frac{1}{b} & 0 \end{pmatrix} * \begin{pmatrix} u \\ v \\ d \\ 1 \end{pmatrix} \quad (EQ\ 9)$$

$$X'_{camera} = \frac{x'}{w'}; \quad Y'_{camera} = \frac{y'}{w'}; \quad Z'_{camera} = \frac{z'}{w'}; \quad \text{(EQ 10)}$$

$$\begin{pmatrix} X_{camera} \\ Y_{camera} \\ Z_{camera} \end{pmatrix} = \begin{pmatrix} 1 & 0 & 0 \\ 0 & -1 & 0 \\ 0 & 0 & 1 \end{pmatrix} * \begin{pmatrix} X'_{camera} \\ Y'_{camera} \\ Z'_{camera} \end{pmatrix} \quad \text{(EQ 11)}$$

At 1012, the one or more processors may determine the type of the recognized traffic sign. Further, a type of the recognized traffic sign may be determined before block 1010.

At 1014, the one or more processors may receive GPS information from a GPS receiver. For example, the GPS information may be used with map information to determine a geographic location of the vehicle and the geographic location of the sign that has been recognized to identify the type of the traffic sign (e.g., speed limit on conventional road).

In some implementations, the one or more processors may receive speed information indicating a speed of the car and map information. The one or more processors may determine based on speed information, GPS information, and the map information that the vehicle is currently on a private road and therefore may disregard the recognized traffic sign. For example, if the current speed of the vehicle is low (e.g., 10 mph) and/or the GPS and map information that the vehicle is not traveling on a highway, then the one or more processors may determine that the vehicle is on a private road (e.g., parking lot, driveway, etc.) and therefore may disregard a recognized sign. In this case, processing may return to block 1002. The one or more processors may also determine whether the vehicle is on a private or public road and therefore to disregard a traffic sign in an obtained image earlier in the process, such as at the time of determining whether a sign is recognized, at block 1006.

At 1016, the one or more processors may obtain sign information related to the recognized sign type from a data structure of stored sign information. Further, in some cases, the data structure may contain information that differs based on different geographic jurisdictions, such as for different states, different countries, and the like. Accordingly, information related to the recognized sign type may be retrieved from the data structure based on the sign type of the recognized sign and geographic location information, and may include information such as the height H and width W of a sign or dimensions of borders of the sign, for example.

The information obtained may also indicate size dimensions and position specifications of letters, words, numbers, symbols, borders, and so forth. Accordingly, an error in one or more dimensions may be calculated based on the actual dimensions of the layout information specifications.

In case one or more dimensions of a road marking are measured, then information may be obtained about the actual dimensions of the recognized road marking. Accordingly, a Y direction or a Z direction error may be calculated and a Z direction calibration calculation may be directly calculated.

Further, in some implementations the size of a license plate is measured instead of or in combination with a traffic sign in bocks 1002-1008. In this case, information indicating actual dimensions of a license plate from a jurisdiction's authority may be obtained and used in the error determination calculation.

At 1018, the one or more processors may calculate an error along the X direction Δx and an error along the Y direction Δy using the following equation for each distance measured from the camera to the traffic sign acquired (e.g., $Z_1$, $Z_2$, etc.):

$$\Delta x = (W - w) \quad \text{(EQ12)}$$

$$\Delta y = (H - h) \quad \text{(EQ13)}$$

In EQ12 and EQ13, W indicates the actual width and H indicates the actual height of the recognized traffic sign based on the stored sign information. Accordingly, the error along the X direction Δx and the error along the Y direction Δy for each distance may be calculated.

At 1020, the one or more processors calculate parameters u' and v' based on the calculated errors Δx and Δy. The parameters u' and v' are functions of Δx and Δy and are calculated using the following equations:

$$u' = f(\Delta x) \quad \text{(EQ14)}$$

$$v' = f(\Delta y) \quad \text{(EQ15)}$$

The parameters u' and v' are calculated for each measured distance from the camera to the traffic sign. For example, at each measured distance for a traffic sign, Δx and Δy errors may be calculated as described above and corresponding parameters u' and v' are calculated by setting Δx and Δy equal to zero, i.e., w=W and h=H as shown in EQ12 and EQ13, respectively. Thus, w may be replaced by W in EQ7 and h may be replaced by H in EQ8. EQ10 and EQ11 may be used with EQ16 below to calculate the value of parameters u' and v' for any particular situation.

EQ9 may be updated to include the calculated u' and v' parameters, as shown in EQ16:

$$\begin{pmatrix} x' \\ y' \\ z' \\ w' \end{pmatrix} = \begin{pmatrix} 1 & 0 & 0 & u' \\ 0 & 1 & 0 & v' \\ 0 & 0 & 0 & \frac{f}{\delta} \\ 0 & 0 & \frac{1}{b} & 0 \end{pmatrix} * \begin{pmatrix} u \\ v \\ d \\ 1 \end{pmatrix} \quad \text{(EQ 16)}$$

In some implementations, the camera is calibrated at the time of manufacturing (i.e., factory calibrated) and may include parameters to correct errors (e.g., Δu and Δv). In this case, the equation may be updated to include the parameters u' and v' as shown in the following equation:

$$\begin{pmatrix} x' \\ y' \\ z' \\ w' \end{pmatrix} = \begin{pmatrix} 1 & 0 & 0 & (\Delta u + u') \\ 0 & 1 & 0 & (\Delta v + v') \\ 0 & 0 & 0 & \frac{f}{\delta} \\ 0 & 0 & \frac{1}{b} & 0 \end{pmatrix} * \begin{pmatrix} u \\ v \\ d \\ 1 \end{pmatrix} \quad \text{(EQ 17)}$$

At 1022, the one or more processors generate a data structure (e.g. . . . , X direction and Y direction errors for each distance 236) to store the calculated X direction error Δx, Y direction error Δy, u', and v' parameters for each measured distance of the recognized traffic sign.

At 1024, the one or more processors calculate a Z direction error Δz for each measured distance based on the calculated X direction error Δx, calculated Y direction error Δy, and the error relationship information data structure 230. Accordingly, the one or more processors receive temperature information from a temperature sensor indicating a temperature. Based on the received temperature, $\Delta x$, $\Delta y$, and a Z direction error $\Delta z$ for each measured distance may be determined by referring to the stored relationship information of the Z direction error with the X direction error and Y direction error based on temperature. Further, a data structure 237 indicating a Z direction error $\Delta z$ calculation is generated that includes the $\Delta x$, $\Delta y$, and $\Delta z$ values calculated for each distance.

At 1026, the one or more processors calculate a new parameter $\Delta f$ and update EQ16 and/or EQ17, and EQ6. For example, the parameter $\Delta f$ minimizes the values $\Delta z$ for all the distances in data structure 237 generated in block 1024. For example, $\Delta f$ is calculated to make the $\Delta z_n$ (n=1, 2, 3 . . . m) values lowest. Further, for example, in the case that two traffic signs are recognized and used for the calibration process herein, for the focal length parameter $\Delta f$, a focal length $\Delta f_1$ and $\Delta f_2$ each of the two recognized traffic signs may be averaged. Further, EQ16 is updated to introduce the calculated parameter $\Delta f$ that minimizes the error along the Z direction, as shown in the equation below:

$$\begin{pmatrix} x' \\ y' \\ z' \\ w' \end{pmatrix} = \begin{pmatrix} 1 & 0 & 0 & u' \\ 0 & 1 & 0 & v' \\ 0 & 0 & 0 & \frac{(f+\Delta f)}{\delta} \\ 0 & 0 & \frac{1}{b} & 0 \end{pmatrix} * \begin{pmatrix} u \\ v \\ d \\ 1 \end{pmatrix} \quad \text{(EQ 18)}$$

Further, in the case of a factory calibrated camera, equation EQ17 is updated to include the parameter $\Delta f$ as shown in the equation below:

$$\begin{pmatrix} x' \\ y' \\ z' \\ w' \end{pmatrix} = \begin{pmatrix} 1 & 0 & 0 & (\Delta u + u') \\ 0 & 1 & 0 & (\Delta v + v') \\ 0 & 0 & 0 & \frac{(f+\Delta f)}{\delta} \\ 0 & 0 & \frac{1}{b} & 0 \end{pmatrix} * \begin{pmatrix} u \\ v \\ d \\ 1 \end{pmatrix} \quad \text{(EQ 19)}$$

Additionally, equation EQ6 is updated with the new parameter $\Delta f$ as shown in the equation below:

$$Z_{camera} = \frac{(f+\Delta f) \times b}{d \times \delta} \quad \text{(EQ 20)}$$

Accordingly, the parameters of the camera are calibrated as described above. Equation EQ20 (updated equation EQ6) will be used for subsequent measurement of objects to determine their distance. As the vehicle is traveling down a road, for example, once a sign is detected and recognized (as in steps 1002-1006, the calibration parameters may be re-calculated. In this way, the camera parameters are continuously and automatically calculated as the vehicle travels down a road. Further, EQ18 or EQ19 is used for the measurement of any objects until a subsequent re-calibration is performed, which may occur when another traffic sign is recognized. In particular, the distance, height, and width of objects (vehicles, bicycles, pedestrians, etc.,) are calculated using the updated equations EQ18 or EQ19 as the vehicle travels on a road. In some implementations, step 1018 is completed before the vehicle passes the traffic sign identified and recognized in 1006 that is used for calibration. Accordingly, as a result of continuously and automatically calibrating the camera parameters using traffic signs that are detected and recognized according to the above, accurate three-dimensional measurement of objects is achieved.

In some implementations, the measured distance, height, and width of objects may be stored in object size information data structure 237. The one or more processors may send one or more control signals to at least one vehicle component based on the calculated distance, height, and width of detected objects in the data structure 237. For example, based on the size of the detected object and the distance of the detected object as measured using the equations EQ18 or EQ19, the one or more processors may make one or more decisions, such as for controlling the vehicle to avoid a collision, issuing a warning to an occupant, or the like. For instance, the one or more processors may send a control signal to adjust the steering of the vehicle, to apply the brakes of the vehicle, to accelerate or decelerate the engine or motor, or to perform other functions for controlling the vehicle. Additionally, or alternatively, such as in the case of an ADAS system or a semi-autonomous vehicle, the one or more processors may issue an alert to warn a driver of a detected condition, based on the size of the object detected and the like. Further, the one or more processors may send, to a display, an indication of the size of the detected object so that corresponding graphics may be overlaid on one or more images of the road in real time or near-real time.

The calibration process described herein, e.g., in FIG. 10, may also be performed using a monocular camera. In this case, an additional sensor, such as radar, laser, or LIDAR, etc. may be used in combination with the camera to detect the sign distance. Subsequently, coordinate transformation is performed on the information from the additional sensor to estimate the sign distance. Further, a sign distance may be measured by measuring the height and width of the sign and using the following equation:

$$\text{Distance} = (f \times W)/w \quad \text{(EQ21)}$$

In equation EQ21, f is the focal length of the camera, W is the actual width of the recognized traffic sign and w is the measured width of the traffic sign.

FIG. 11 is a flow diagram illustrating an example process 1000 for recognizing a traffic sign according to some implementations. In some examples, the process 1000 may be performed by one or more processors executing the recognition program.

At 1102, the one or more processors may receive one or more images from one or more sensors. For example, in the case that the sensors include one or more cameras, the images may be obtained using visible light, infrared light, or both. Further, the one or more images may be obtained additionally, or alternatively, using other sensing technologies, or combinations thereof, such as LIDAR, radar, ultrasound, and so forth.

At 1104, the one or more processors may preprocess the one or more images to reduce noise in the images. For example, in the case that the images are obtained from a camera using visible and/or infrared light, one or more filtering techniques may be used to remove noise, such as salt and pepper noise, Gaussian noise, or the like, from the images. Examples of techniques that may be used include linear smoothing filters, chroma-and-luminance noise separation, wavelet transforms, statistical methods, and nonlinear filters.

At 1106, the one or more processors may detect a sign in a received image. For example, the one or more processor may detect that one of the images includes a traffic sign, but the sign may not yet be recognizable at that point. Further, implementations herein may detect and recognize signs on the both sides of a road.

At 1108, the one or more processors may track the detected sign in subsequent received images. The one or more processors may track the sign in a sequence of images, and as the vehicle approaches closer to the sign, may perform additional recognition functions to attempt to recognize the sign type of the sign. Further, by tracking the sign in multiple images, the one or more processors may determine the location of the sign with respect to the vehicle's frame of reference, and thereby may determine the distance of the sign with respect to the vehicle.

At 1110, the one or more processors may recognize a sign type of the detected sign from one or more of the images. In some cases, the one or more processors may use various features of the sign for recognizing the sign type of the sign, such as by recognizing text on the sign, color, shape, size, support structures of the sign, may distinguish the front of a sign from the rear of a sign, and so forth. As one example, the recognition program 320 may be executed on the one or more processors to include, or to employ, a computational model that has been trained using training data to recognize various different sign types from different angles, different distances, different weather conditions, different light conditions, and so forth. In some cases, the computational model may be periodically updated and re-trained based on new training data to keep the computational model up to date. Examples of computational models that may be used in some implementations herein may include predictive models, decision trees, classifiers, regression models, such as linear regression models, support vector machines, and stochastic models, such as Markov models and hidden Markov models, artificial neural networks, such as recurrent neural networks, long short term memory (LSTM) neural networks, and so forth. When a sign type has been recognized, the one or more processors may then perform camera parameter calibration, e.g., as discussed above with respect to FIG. 10.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as programs stored on computer-readable media, and executed by the processor(s) herein. Generally, programs include routines, modules, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs, algorithms, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors;
a camera onboard a vehicle that is coupled to the one or more processors;
one or more non-transitory computer-readable media storing first object information indicating specified dimensions of a plurality of objects;
the one or more non-transitory computer-readable media further including executable instructions, which, when executed by the one or more processors, configure the one or more processors to:
receive at least one first image from the camera onboard the vehicle;
recognize a first object within the received at least one first image;
determine, based on the at least one first image, a distance of the first object from the camera in a first direction, a width of the first object in a second direction, and a height of the first object in a third direction;
receive, from the stored first object information, the specified dimensions of the first object including a specified width of the recognized first object and a specified height of the recognized first object;
determine a measurement error of the second direction based on the determined width of the first object and the specified width of the first object, and determine a measurement error of the third direction based on the determined height of the first object and the specified height of the first object;
determine a measurement error of the first direction based on the determined measurement error of the second direction and the determined measurement error of the third direction;
determine one or more calibration parameters of the camera based on the determined measurement errors of the first, second, and third directions; and
determine at least one of a distance along a first direction, a width along a second direction, or a height along a third direction of a second object within at least one second image received from the camera using the one or more calibration parameters.

2. The system of claim 1, wherein the instructions further configure the one or more processors to send one or more control signals to control a vehicle drive component based on at least one of the determined distance, height, or width of the second object within the at least one second image.

3. The system of claim 1, wherein:
the camera is a stereo camera, and
the one or more calibration parameters include a focal length of the stereo camera, a u coordinate calibration corresponding to the second direction based on the measurement error of the second direction, and a v coordinate calibration corresponding to the third direction based on the measurement error of the third direction.

4. The system of claim 1, wherein the first object is a traffic sign, wherein the stored first object information includes a specified height and a specified width for each of a plurality of different types of first objects in relation to road type information for the respective plurality of types of first objects, wherein the one or more processors are further configured to:
- recognize a sign type of the first object in the at least one first image;
- receive geographic location information indicating a geographic location of the vehicle;
- determine a type of road the first object is on based on the geographic location information; and
- receive the specified dimensions of the first object including the specified width of the first object and the specified height of the first object from the stored first object information based on the sign type of the first object and the determined type of road.

5. The system of claim 1, further comprising:
- a temperature sensor coupled to the one or more processors, wherein the one or more non-transitory computer-readable media store, for each of a plurality of temperatures, a measurement error of the first direction that relates to a measurement error of each of the second and third directions, wherein the one or more processors are further configured to:
- receive information indicating a temperature from the temperature sensor; and
- determine the measurement error of the first direction based on a stored measurement error of the first direction that relates to each of the received temperature information, and respective errors of each of the second and third directions.

6. The system of claim 1, wherein the one or more processors are further configured to:
- determine a plurality of distances of the first object from the at least one sensor in the first direction;
- for each determined distance of the first object, determine the measurement error of the first direction, the measurement error of the second direction, and the measurement error of the third direction; and
- determine a focal length calibration parameter, which is one of the one or more calibration parameters of the camera, that minimizes the error along the first direction for each of the measured plurality of distances of the first object.

7. The system of claim 1, wherein the first object is a traffic sign and wherein the stored first object information includes information indicating a specified height and a specified width of one or more markings on the traffic sign, wherein the one or more processors are further configured to:
- determine a width of one or more markings on the traffic sign in a second direction, and measure a height of the one or more markings on the traffic sign in a third direction based on the at least one first image;
- receive specified dimensions of the one or more markings on the traffic sign including the specified width of the one or more markings and the specified height of the one or more markings of the traffic sign from the stored first object information;
- determine a measurement error of the second direction based on the measured width of the one or more markings and the specified width of the one or more markings; and
- determine a measurement error of the third direction based on the measured height of the one or more markings and the specified height of the one or more markings.

8. The system of claim 7, wherein the one or more markings on the traffic sign are at least one of a letter, a number, a word, a symbol, or a border.

9. The system of claim 1, wherein the first object is a road marking, wherein the one or more non-transitory computer-readable media further store road marking information indicating a specified distance of the road marking in the first direction, wherein the one or more processors are further configured to:
- measure a distance of the road marking in the first direction;
- receive specified dimensions of the recognized road marking including the specified distance of the road marking in the first direction; and
- determine a measurement error of the first direction based on one of a difference between the measured distance of the road marking and the specified distance of the marking in the first direction, and the determined measurement error of the second direction and the determined measurement error of the third direction.

10. The system of claim 1, wherein the first object is a license plate disposed on another vehicle.

11. The system of claim 1, further comprising:
- a sensor onboard the vehicle, which is one of radar, laser, LIDAR and ultrasound,
- wherein the camera is a monocular camera, and
- wherein the distance of the first object is measured by the sensor.

12. The system of claim 1, wherein the one or more processors are further configured to:
- determine whether the vehicle is on a private road or on a public road based on at least one of speed of the vehicle, a size of a recognized traffic sign, or geographical location information; and
- upon determining the vehicle is on a private road, continuously receive images from the camera without determining measurement errors of the first, second, and third directions.

13. A method for operating a vehicle, comprising:
- storing, by one or more processors onboard the vehicle, first object information indicating specified height and specified width dimensions of a plurality of first objects;
- receiving, by the one or more processors, at least one first image from a camera onboard a vehicle that is coupled to the one or more processors;
- recognizing, by the one or more processors, a first object within the received at least one first image;
- measuring, by the one or more processors, a distance of the first object from the camera in a first direction, measure a width of the first object in a second direction, and measure a height of the first object in a third direction based on the at least one first image;
- determining, by the one or more processors, specified dimensions of the first object including a specified width of the first object and a specified height of the first object from the stored first object information;
- determining, by the one or more processors, a measurement error of the second direction based on the measured width of the first object and the specified width of the first object, and determining a measurement error of the third direction based on the measured height of the first object and the specified height of the first object;

determining, by the one or more processors, a measurement error of the first direction based on the determined measurement error of the second direction and the determined measurement error of the third direction;

determining, by the one or more processors, one or more calibration parameters of the camera based on the determined measurement errors of the first, second, and third directions;

determining, by the one or more processors, a distance along a first direction, a width along a second direction, and a height along a third direction of a second object within at least one second image received from the camera using the calculated one or more calibration parameters; and sending one or more control signals to control a vehicle drive component based on at least one of the measured distance, height, or width of the second object within the at least one second image.

14. The method of claim 13, wherein the first object is one of a traffic sign or a road marking.

15. A non-transitory computer readable medium storing processor executable instructions which, when executed by one or more processors, configure the one or more processors to:

receive at least one first image from a camera onboard a vehicle;

recognize a first object within the received at least one first image;

measure a distance of the first object from the camera in a first direction, measure a width of the first object in a second direction, and measure a height of the first object in a third direction based on the at least one first image;

determine specified dimensions of the first object including a specified width of the first object and a specified height of the first object from the stored first object information;

determine a measurement error of the second direction based on the measured width of the first object and the specified width of the first object, and determine a measurement error of the third direction based on the measured height of the first object and the specified height of the first object;

determine a measurement error of the first direction based on the determined measurement error of the second direction and the determined measurement error of the third direction;

calculate one or more calibration parameters of the camera based on the determined measurement errors of the first, second, and third directions; and determine a distance along a first direction, a width along a second direction, and a height along a third direction of a second object within at least one second image received from the camera using the calculated one or more calibration parameters.

16. The non-transitory computer readable medium as recited in claim 15, wherein the one or more processors are further configured to send one or more control signals to control a vehicle drive component based on at least one of the determined distance, height, or width of the second object within the at least one second image.

17. The non-transitory computer readable medium as recited in claim 15, wherein:

the camera is a stereo camera, and the one or more calibration parameters include a focal length of the stereo camera, a u coordinate calibration corresponding to the second direction based on the measurement error of the second direction, and a v coordinate calibration corresponding to the third direction based on the measurement error of the third direction.

18. The non-transitory computer readable medium as recited in claim 15, wherein the first object is a traffic sign, wherein the stored first object information includes a specified height and a specified width for each of a plurality of different types of first objects in relation to road type information for the respective plurality of types of first objects, wherein the one or more processors are further configured to:

recognize a sign type of the first object in the at least one first image;

receive geographic location information indicating a geographic location of the vehicle;

determine a type of road the first object is on based on the geographic location information; and receive the specified dimensions of the first object including the specified width of the first object and the specified height of the first object from the stored first object information based on the sign type of the first object and the determined type of road.

19. The method as recited in claim 13, wherein:

the camera is a stereo camera, and the one or more calibration parameters include a focal length of the stereo camera, a u coordinate calibration corresponding to the second direction based on the measurement error of the second direction, and a v coordinate calibration corresponding to the third direction based on the measurement error of the third direction.

20. The method as recited in claim 13, wherein the first object is a traffic sign, wherein the stored first object information includes a specified height and a specified width for each of a plurality of different types of first objects in relation to road type information for the respective plurality of types of first objects, the method further comprising:

recognizing a sign type of the first object in the at least one first image;

receiving geographic location information indicating a geographic location of the vehicle;

determining a type of road the first object is on based on the geographic location information; and receiving the specified dimensions of the first object including the specified width of the first object and the specified height of the first object from the stored first object information based on the sign type of the first object and the determined type of road.

* * * * *